Figure 1:
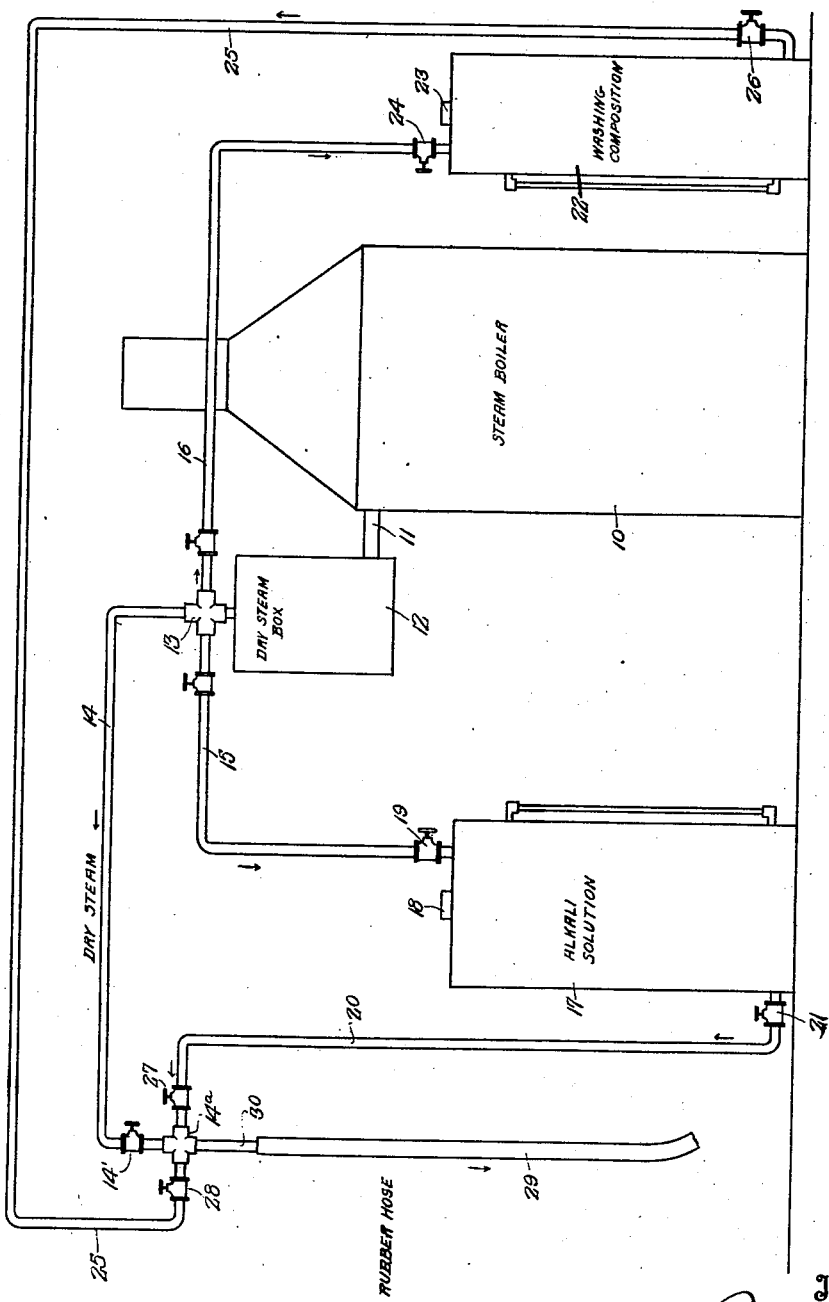

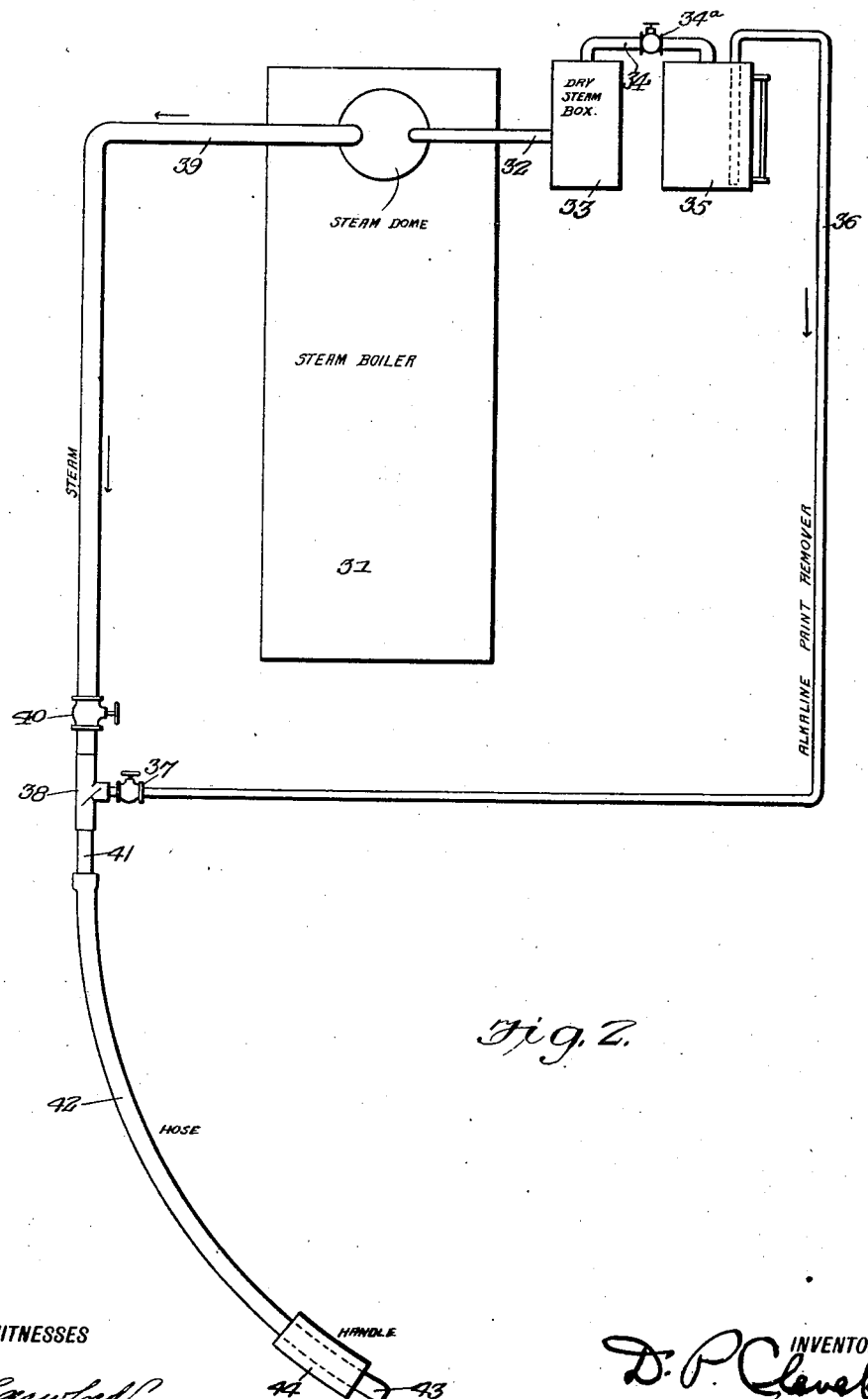

Patented Mar. 10, 1925.

1,529,168

UNITED STATES PATENT OFFICE.

DAVID P. CLEVELAND, OF DALLAS, TEXAS.

PROCESS OF REMOVING FINISH COATING.

Application filed September 13, 1920. Serial No. 409,915.

*To all whom it may concern:*

Be it known that I, DAVID P. CLEVELAND, a citizen of the United States, residing at Dallas, in the county of Dallas and State of Texas, have invented certain new and useful Improvements in Processes of Removing Finish Coating, of which the following is a specification.

This invention relates to the removal of paint, varnish, lacquer and the like from surfaces of coated articles, and has special reference to the removal of such coatings after they have dried, and if desired after many successive repaintings, for preparing the article for repainting or refinishing. The coated articles under treatment may be carriages, automobiles, furniture, walls, floors or other coated objects which it is desired to repaint or refinish. The process is especially useful and effective in connection with the removal of paint and varnish from automobiles.

Various methods have been used, prior to the present invention, for removing finish coatings by the use of heat and an alkali solution, but the process of the present invention has been found to be superior in performance and superior in results as well as much quicker in action. The invention comprises the steps of spraying a hot fixed caustic alkali upon the painted surface, under conditions to disintegrate the finish coating, and removing the reaction products and excess of caustic solution. Paints and varnishes, when the same have dried on the surfaces of painted articles, consist largely of oxidized and dried oils, resins, gums, etc., together with insoluble pigments and the like. The action of the hot caustic alkali on such a product is to saponify the organic material. This is, when saponified, in solution in the water contained in the paint remover liquid, and the further amounts of water produced by condensation of steam, tend to quite thoroughly wash off the soapy solution and loosened pigment, together with whatever dirt, dust, etc., may also be present.

The first step of my present process can readily be accomplished by introducing steam, which is preferably "dry" (in accordance with the common usage of this term) into a receptacle containing an aqueous solution in which is included a fixed caustic alkali. This causes the solution to be heated somewhat and also to be displaced from the receptacle under steam pressure. The steam-heated chemical solution is conveyed to a pipe through which live steam is passing, whereby the steam and alkali solution are mixed, and converted into a diffused coarse spray (as distinguished from atomization). After the steam-heated chemical solution is mixed with the steam, the mixture is conveyed by an ordinary hose and allowed to escape from the end of the hose on to the surface being treated, no "nozzle" (i. e., atomizer or the like) is used and the discharge from the hose is neither atomized nor in the form of a jet of particles as small as those produced by atomization.

It has been found that by this method the alkali becomes thoroughly mixed with the steam and thoroughly heated, and it attacks the painted surface over a larger area and with more rapid results.

In order to carry out the process, some apparatus is necessary.

In the accompanying drawings, two forms of apparatus, for carrying out the process of my invention are shown, by way of example, of the large number of possible forms which might be used.

In said drawings, Fig. 1 shows a vertical elevation of a suitable apparatus, which I consider as the preferred construction, and Fig. 2 shows a similar view of another and somewhat less desirable form of apparatus.

In Fig. 1, the numeral 10 designates a suitable boiler having a steam pipe 11 leading from its upper portion. The steam pipe enters the lower portion of a steam drum 12. The object of this arrangement is to get so-called "dry" steam from the drum 12. A four-way coupling 13 is connected with the top of the drum. A steam supply pipe 14 leads from the top of the coupling to another four-way coupling 14$^a$. A branch steam pipe 15 leads from one side of the coupling 13, and a second steam pipe 16 leads from the other side of this coupling.

The pipe 15 enters the top of the chemical tank 17, having a filling cap 18. A cut-off valve 19 is included in the pipe 15, for example just above the tank 17. A discharge pipe 20 having a valve or cock 21, leads from the bottom of the tank 17, and is connected with the four-way connection 14$^a$, just below a cut-off valve 14', in pipe 14.

The pipe 16 enters the top of a tank 22, for washing powder solution, said tank having a filling cap 23 in its top. A valve 24 is included in the pipe 15, for example, just above the tank 22. A discharge pipe 25 leads from the bottom of the tank 22, and includes a cut-off valve 26, which may be located adjacent said tank. This pipe 25 is connected with the four-way connection 14ª. A second cut-off valve 27 may be included in the pipe 20, adjacent to connection 14ª, and a second cut-off valve 28 may be included in the pipe 25, adjacent the connection 14ª.

It will be seen that when it is desired to remove the finish coating of an article, the valves 24 and 28 are closed, so that the steam cannot enter the tank 22, and therefore the contents of tank 22 cannot pass to the pipe 25 and enter the connection 14ª. The valve 19 is opened, whereby steam is admitted to the upper portion of the tank 17. The steam thus admitted to the tank 17 will naturally heat the solution therein and create a pressure on the same whereby it will be discharged into the pipe 20, provided the valve 21 is open. The valve 27 is opened, a regulated amount, so as to permit the heated chemical to discharge into the connection 14ª, at the end of pipe 14. The valve 14', in the pipe 14, is opened, whereby steam will pass from the drum and mix with the heated solution in the connection 14ª. An ordinary hose 29, which may be a one-inch rubber hose, is attached to the end of the pipe 30, leading from connection 14ª, and said hose receives the steam and chemical solution in a state of admixture. An ordinary garden hose is very suitable for this purpose, and it is not necessary, and apparently it is not desirable, to employ any obstructions in said hose. No nozzle on the end of the hose is needed. The spray is discharged from the end of the hose and directed against the surface being treated. The steam will heat the surface and the hot solution will attack the finish, whereby the latter is disintegrated.

After the finish has been substantially all removed from the surface, the valves 19, 21 and 27 are closed, and the valves 24 and 26 opened. The valve 28 is opened a regulated amount. This cuts off the supply of steam to the chemical tank 17, and the discharge from said tank to the pipe 14, and admits steam to the tank 22, whereby the solution in the same is heated and discharged through the pipe 25 into the connection 14ª. This is the washing solution (e. g., a solution of ordinary washing powder) and by going over the surface all traces of the free caustic alkali of the paint remover used in the first operation are quickly washed off and the surface cleaned. After this operation the surface is washed off with a stream of ordinary water (cold or hot). When the surface has thoroughly dried it is ready for repainting.

The alkali solution used in the tank 17 can be varied considerably, and a convenient and efficient solution for removing paint from automobiles, the original painted surface being metal, is made by adding ten pounds of caustic soda to every twenty-five gallons of water. In some instances it is advisable to also add about one and one-quarter pounds of lime, but this depends upon the grade of the caustic soda used, and acts to precipitate any carbonate originally present in the caustic soda, also a small amount of dissolved lime seems to be helpful. Caustic potash could also be used as a substitute for all or part of the caustic soda. The mixture is preferably made up, stirred well and settled, after which it may be drawn off from any sediment or precipitate, into tank 17. The foregoing described solution is merely one of the efficient and suitable mixtures which have been found to give good results in the process and the invention is not limited thereto; any solution of fixed caustic alkali of suitable degree of concentration can be employed.

The washing solution is preferably made of about one-half pound of ordinary commercial washing powder, (e. g., mixtures of powdered soap, borax, soda ash, etc., which may be bought at almost any grocery store) to twenty-five gallons of water. Any washing powder which would tend to wash off the slight quantity of fixed caustic alkali remaining from the first operation, can be used, and the invention is not to be limited to any particular kind.

Tests of this process and apparatus show that it is possible to remove the paint from the body of a Ford automobile in nine minutes, and to remove the paint from the body, running gear and the wheels, only about twenty-five minutes is required. In larger cars, such as an ordinary five-passenger touring car, about eleven minutes is required to remove the paint entirely from the body, and about eight minutes from the wheels. This does not include the running gears. On particularly well finished cars the work will require a longer time; however, the finish has been removed from the back panel of the body of a seven-passenger touring car in from two to three minutes.

Fig. 2 shows another form of apparatus which may be employed. This apparatus is substantially simpler than that shown in Fig. 1 (the preferred apparatus), but for some purposes it works very well. This apparatus will now be described in connection with the operation of the simplified process.

31 is a steam boiler of any ordinary construction, having an off-take pipe 32, leading to a dry steam box or separator 33, from which dry steam under pressure passes by pipe 34 (valve 34ª being open) into a tank 35, containing the alkaline paint-remover liquid, (which may be the same as that above described). The liquid is forced through pipe 36, containing a valve 37, into the T-union 38. Steam (preferably dry) also passes from the dome of the boiler through pipe 39, regulated by cock 40, into the union 38, the volume of steam being, of course, many times greater than the volume of paint-remover liquid. This breaks up the stream of the paint-remover liquid in the union or T-connection 38, so that steam carrying a spray of the hot paint-remover liquid passes through the nipple 41 and rubber hose 42, to the outlet 43 thereof. If desired, a suitable handle as shown at 44, may be placed upon the hose for convenience in handling and operating the same. This handle can be omitted if desired.

By means of this device the spray of paint-remover liquid and steam is applied to the surface of the article from which the paint is to be removed, which surface is kept hot by the excess of steam and the paint is thereby rapidly disintegrated and removed from the surface.

The workman holds the handle 14 in his hand and moves the same horizontally back and forth, across the upper part of the surface of a given area. This operation is continued, gradually working downwardly over the surface under treatment, until a considerable amount of surface has been cleaned. This operation is continued on each portion of surface, until the paint and varnish are thoroughly removed.

During this treatment (as during the first step of the more desirable process above described, the alkali solution in contact with the work being treated, is maintained substantially at the boiling point, and the surface is constantly kept hot by the continued application of the steam in large volumes.

Since alkali solutions, especially if hot, would usually injure trimmings and the like (made of leather, artificial leather, cloth, plush and similar materials), it is sometimes advisable to first clean off a strip, say a few inches wide, from the portions of the painted surface adjacent to such trimmings, by any ordinary paint-removing methods.

When the paint and varnish have been loosened and substantially all removed from the surface, or from some part thereof (say, the back of an automobile) it is advisable, but not necessary, to shut off the flow of paint-remover liquid to the hose, and to then go over the entire surface (which may have cooled more or less in the meantime) with a steam jet, to wash off adhering particles of pigment, flakes of loosened paint, and particularly the adhering film of dried paint remover. The entire job may be finally washed with a stream of hot or cold water, from a hose, or in any other convenient way.

This leaves the original surface practically as it stood before the original painting. It is usually unnecessary to sandpaper the work before repainting, although a light rubbing with steel wool or fine sandpaper may be advisable in some cases.

After thoroughly drying the surface, the work is then ready for repainting, re-enameling or other like operations.

It has been found that surface from which the paint has been removed with this process will more readily take a new coating of paint.

The process of my present application is an improvement on the process of my prior applications Serial No. 300,583, filed May 29, 1919, and 348,472, filed December 30, 1919 (now Patent No. 1,355,074, October 5, 1920).

What I claim is:

A process of removing finish coating from an article, which comprises the step of simultaneously applying steam and a finish remover containing a dilute solution of a fixed caustic alkali to the surface of said article, the amount of steam being sufficient to maintain the caustic solution on the surface in substantially a boiling condition until the finish is disintegrated, then washing off the surface by applying thereto steam simultaneously with a solution comprising water in which commercial washing powder has been dissolved, and then washing off the surface with clear water.

In testimony whereof I affix my signature.

DAVID P. CLEVELAND.